US009751769B2

(12) United States Patent
Watanabe et al.

(10) Patent No.: US 9,751,769 B2
(45) Date of Patent: Sep. 5, 2017

(54) METHOD FOR PRODUCTION OF TITANIUM CARBIDE NANOPARTICLES

(71) Applicant: NISSHIN ENGINEERING INC., Chuo-ku, Tokyo (JP)

(72) Inventors: Shu Watanabe, Fujimino (JP); Keitaroh Nakamura, Fujimino (JP)

(73) Assignee: NISSHIN ENGINEERING INC., Tokyo (JP)

( * ) Notice: Subject to any disclaimer, the term of this patent is extended or adjusted under 35 U.S.C. 154(b) by 0 days.

(21) Appl. No.: 14/411,850

(22) PCT Filed: Jun. 3, 2013

(86) PCT No.: PCT/JP2013/065373
§ 371 (c)(1),
(2) Date: Dec. 29, 2014

(87) PCT Pub. No.: WO2014/002695
PCT Pub. Date: Jan. 3, 2014

(65) Prior Publication Data
US 2015/0175429 A1 Jun. 25, 2015

(30) Foreign Application Priority Data
Jun. 28, 2012 (JP) ................................ 2012-145833

(51) Int. Cl.
*C01B 31/00* (2006.01)
*C01B 31/30* (2006.01)
*H05H 1/30* (2006.01)

(52) U.S. Cl.
CPC ............ *C01B 31/305* (2013.01); *H05H 1/30* (2013.01)

(58) Field of Classification Search
CPC ................................ C01B 31/305; H05H 1/30
(Continued)

(56) References Cited

U.S. PATENT DOCUMENTS 4,022,872 A 5/1977 Carson et al.
5,356,120 A 10/1994 Koenig et al.
(Continued)

FOREIGN PATENT DOCUMENTS

CN 1445163 A 10/2003
JP 52-047502 A 4/1977
(Continued)

OTHER PUBLICATIONS

Tong, L. et al, "Synthesis of titanium carbide nano-powders by thermal plasma", *Scripta Materialia*, vol. 52, Iss. 12, pp. 1253-1258, 2005.
(Continued)

*Primary Examiner* — Daniel C McCracken
(74) *Attorney, Agent, or Firm* — Muncy, Geissler, Olds & Lowe, P.C.

(57) ABSTRACT

A method for production of titanium carbide nanoparticles, the method having: a step for supplying titanium powder or titanium oxide powder into a thermal plasma flame; and a step for producing titanium carbide nanoparticles by supplying a reactive gas as a cooling gas and as a source of carbon at the downstream end of the thermal plasma flame. By varying the supplied quantity of the reactive gas, the oxygen concentration of the produced titanium carbide nanoparticles is varied. Therefore, for example, titanium carbide nanoparticles having different volume resistivity values can be produced.

10 Claims, 6 Drawing Sheets

28d 28 10 28e 28a 28b 28c MATERIAL SUPPLY DEVICE 14 14a 22c 12c 12 22 P 12b 24 12a 17 Q Q R R 16 U 18 20 19 19e T 19b 22a 22b 20b 15 19a 20a 19c TO VACUUM PUMP 19d

(58) Field of Classification Search
USPC .......................................................... 423/440
See application file for complete search history.

(56) References Cited

U.S. PATENT DOCUMENTS

| | | | | |
|---|---|---|---|---|
| 2005/0191492 | A1* | 9/2005 | Yadav .................. | C01G 23/003 428/407 |
| 2009/0293675 | A1* | 12/2009 | Mukherjee ............. | B22F 3/003 75/346 |

FOREIGN PATENT DOCUMENTS

| | | | |
|---|---|---|---|
| JP | 52-61194 | A | 5/1977 |
| JP | 60-019034 | A | 1/1985 |
| JP | 02-271919 | A | 11/1990 |
| JP | 6-49513 | A | 2/1994 |
| JP | 07-031873 | A | 2/1995 |
| JP | 2003-026416 | A | 1/2003 |
| JP | 2011213524 | A | 10/2011 |
| TW | 201129499 | | 9/2011 |
| WO | WO 2011034129 | | 3/2011 |

OTHER PUBLICATIONS

Mitrofanov, B. et al., "D.C. Arc Plasma Titanium and Vanadium Compound Synthesis from Metal Powders and Gas Phase Non-metals", *Materials Science and Engineering*, vol. 48, pp. 21-26, 1981.

* cited by examiner

10
MATERIAL SUPPLY DEVICE
14
14a
12
12a
12b
12c
P
24
Q
R
15
16
17
19
19a
19b
19c
19d
19e
T
U
18
20
20a
20b
TO VACUUM PUMP
22
22a
22b
22c
28
28a
28b
28c
28d
28e

OXYGEN CONCENTRATION (wt%)
CARRIER GAS FLOW RATE (L/min)
0
2
4
6
8
10
12
5
10
15
20
25
30

METHOD FOR PRODUCTION OF TITANIUM CARBIDE NANOPARTICLES

TECHNICAL FIELD

The present invention relates to a method of producing titanium carbide nanoparticles and more specifically to a method of producing titanium carbide nanoparticles having desired physical properties, desired electric resistance, for instance.

BACKGROUND ART

At present, nanoparticles such as oxide nanoparticles, nitride nanoparticles and titanium carbide nanoparticles are used in the production of sintered bodies for use as electrical insulation materials for semiconductor substrates, printed circuit boards, various electrical insulation parts and the like, materials for high-hardness and high-precision machining tools such as cutting tools, dies and bearings, functional materials for grain boundary capacitors, humidity sensors and the like, and precision sinter molding materials, and in the production of thermal sprayed parts such as engine valves made of materials that are required to be wear-resistant at a high temperature, as well as in the fields of electrode or electrolyte materials and various catalysts for fuel cells.

Of the above-described nanoparticles, titanium carbide nanoparticles are produced by, for example, the production methods disclosed in Patent Literatures 1 and 2.

The purpose of Patent Literature 1 is that homogeneous and fine titanium carbide powder (titanium carbide nanoparticles) can be easily obtained. Patent Literature 1 discloses a method of producing titanium carbide which involves baking oxidized titanium and carbon in a non-oxidizing atmosphere at a temperature of 1,300° C. to 1,800° C. In Patent Literature 1, oxidized titanium with an average particle size of 0.05 μm or less is added as an additive in an amount of 0.05 to 30 parts by weight with respect to 100 parts by weight of oxidized titanium with an average particle size of 0.1 to 5 μm.

Patent Literature 2 aims at providing homogeneous, coarse titanium carbide powder that can provide a homogeneous sintered body or homogeneous, coarse titanium carbide powder for use in the field of titanium carbide and the like to be used in conductive polymers, as well as a production method thereof.

Patent Literature 2 discloses a method of producing titanium carbide powder which uses oxidized titanium and carbon as materials to perform reduction and carbonization in a hydrogen atmosphere at a temperature of 1,500 to 1,750° C.

Patent Literature 2 discloses using the oxidized titanium as a material that has a primary particle size of up to 1 μm and a BET value of 2 $m^2/g$ or more, and using, as a carbon source, carbon black in which primary particles have a particle size of up to 0.5 μm and are not continuously bound to one another.

In addition, it is described in the literature that the particle size of the titanium carbide powder is controlled by adding either or both of Co and Ni in an amount of 0.1 to 0.3 wt % based on the weight of titanium carbide powder in the material mixing step prior to thermal treatment and heating the mixture at a temperature of 1,500 to 1,750° C.

CITATION LIST

Patent Literature

Patent Literature 1:JP 2-271919 A
Patent Literature 2:JP 2003-26416 A

SUMMARY OF INVENTION

Technical Problems

As described above, controlling the particle size is disclosed in the methods of producing titanium carbide nanoparticles in Patent Literatures 1 and 2. Nevertheless, there is at present no production method which includes controlling other physical properties than the particle size for titanium carbide. Therefore, further expansion of applications of titanium carbide nanoparticles and further improvement of functionality by the use of the titanium carbide nanoparticles cannot be expected at present.

An object of the present invention is to solve the problems with the prior art and provide a method of producing titanium carbide nanoparticles having, for example, desired electric resistance as a physical property.

Solution to Problems

The present invention has been made on the basis of the finding that the volume resistance (electric resistance) of titanium carbide nanoparticles varies in value with the oxygen concentration thereof. In the present invention, the oxygen concentration of the titanium carbide nanoparticles is varied so that the volume resistance (electric resistance) of the titanium carbide nanoparticles may be of a desired value.

To be more specific, in order to achieve the foregoing object, the present invention provides a titanium carbide nanoparticle production method comprising: a production step for producing titanium carbide nanoparticles using titanium powder or titanium oxide powder, a carbon source and a thermal plasma flame, wherein an oxygen concentration of the titanium carbide nanoparticles to be produced is varied in the production step by changing an amount of the carbon source.

The production step comprises, for example, a step of supplying the titanium powder or titanium oxide powder into the thermal plasma flame and a step of supplying a cooling gas and a reactive gas serving as the carbon source to an end portion of the thermal plasma flame to produce the titanium carbide nanoparticles, and the oxygen concentration of the titanium carbide nanoparticles to be produced is varied by changing an amount of the reactive gas to be supplied. For example, the reactive gas is methane gas.

In addition, the production step comprises, for example, a step of dispersing the titanium powder or titanium oxide powder in a carbon-containing liquid substance as the carbon source to obtain a slurry and a step of converting the slurry into droplets to supply the droplets into the thermal plasma flame, and the oxygen concentration of the titanium carbide nanoparticles to be produced is varied by changing a feed rate of the slurry.

Moreover, the production step comprises, for example, a step of dispersing the titanium powder or titanium oxide powder in a carbon-containing liquid substance as the carbon source to obtain a slurry and a step of converting the slurry into droplets using a carrier gas to supply the droplets into the thermal plasma flame, and the oxygen concentration of the titanium carbide nanoparticles to be produced is varied by controlling a feed rate of the slurry to be constant and changing a flow rate of the carrier gas in charging the slurry.

The carbon-containing liquid substance is preferably alcohol, ketone, kerosene, octane or gasoline.

The thermal plasma flame is derived from at least one gas of hydrogen, helium and argon, for example.

Advantageous Effects of Invention

According to the present invention, titanium carbide having, for example, desired electric resistance as a physical property can be produced. In addition, the titanium carbide can be easily produced with a high degree of productivity.

DESCRIPTION OF EMBODIMENTS

A method of producing titanium carbide nanoparticles according to the present invention is described below in detail with reference to preferred embodiments shown in the accompanying drawings.

Figure 1:
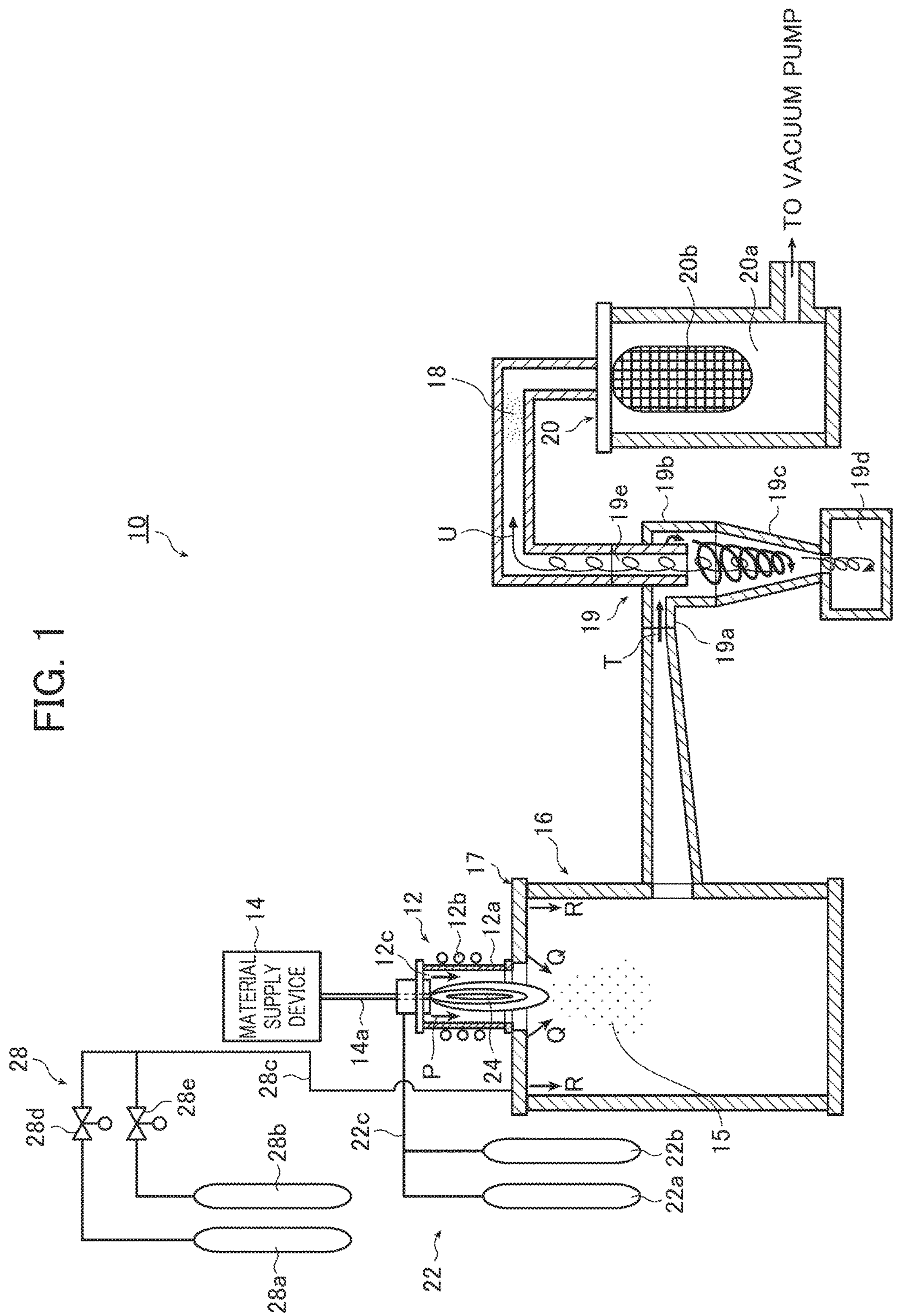
FIG. 1 is a schematic diagram showing an apparatus for producing nanoparticles that is used in a method of producing titanium carbide nanoparticles according to an embodiment of the invention.

FIG. 1 is a schematic diagram showing an apparatus for producing nanoparticles that is used in a method of producing titanium carbide nanoparticles according to an embodiment of the invention.

A nanoparticle production apparatus 10 (hereinafter referred to simply as "production apparatus 10") shown in FIG. 1 is used to produce nanoparticles of titanium carbide (TiC).

The production apparatus 10 includes a plasma torch 12 generating thermal plasma, a material supply device 14 supplying a material (powder material) for producing titanium carbide nanoparticles into the plasma torch 12, a chamber 16 serving as a cooling tank for producing titanium carbide nanoparticles (primary nanoparticles) 15, a cyclone 19 removing, from the produced primary nanoparticles 15, coarse particles having a particle size equal to or larger than an arbitrarily specified particle size, and a collecting section 20 collecting titanium carbide nanoparticles (secondary nanoparticles) 18 having a desired particle size as obtained by classification in the cyclone 19.

Various devices in, for example, JP 2007-138287 A may be used for the material supply device 14, the chamber 16, the cyclone 19 and the collecting section 20.

In the embodiment under consideration, titanium powder or titanium oxide powder is used to produce titanium carbide nanoparticles. In order to readily evaporate in a thermal plasma flame, the titanium powder has an average particle size of, for example, up to 50 μm and preferably up to 10 μm.

The plasma torch 12 includes a quartz tube 12*a* and a coil 12*b* for high frequency oscillation surrounding the outside of the quartz tube. On top of the plasma torch 12, a supply tube 14*a* to be described later which is for supplying titanium powder or titanium oxide powder into the plasma torch 12 in the form of the titanium powder or titanium oxide powder or of a slurry containing the titanium powder or titanium oxide powder as will be described later is provided at the central portion thereof. A plasma gas supply port 12*c* is formed in a peripheral portion of the supply tube 14*a* (on the same circumference). The plasma gas supply port 12*c* is in a ring shape.

Plasma gas is supplied from a plasma gas supply source 22 into the plasma torch 12 through the plasma gas supply port 12*c*.

The plasma gas supply source 22 has a first gas supply section 22*a* and a second gas supply section 22*b*, which are connected to the plasma gas supply port 12*c* through piping 22*c*. Although not shown, the first gas supply section 22*a* and the second gas supply section 22*b* are each provided with a supply amount adjuster such as a valve for adjusting the supply amount.

For example, two types of plasma gases including hydrogen gas and argon gas are prepared. For example, the first gas supply section 22*a* stores hydrogen gas and the second gas supply section 22*b* stores argon gas. The hydrogen gas and the argon gas are respectively supplied as the plasma gases from the first gas supply section 22*a* and the second gas supply section 22*b* of the plasma gas supply source 22 into the plasma torch 12 in a direction indicated by an arrow P after having passed through the ring-shaped plasma gas supply port 12*c* via the piping 22*c*. Then, a high frequency voltage is applied to the coil 12*b* for high frequency oscillation to generate a thermal plasma flame 24 in the plasma torch 12.

The plasma gas is not limited to hydrogen gas and argon gas but includes, for example, at least one gas selected from hydrogen gas, helium gas and argon gas.

In the embodiment under consideration, as will be described later, in a case where carbon is generated by decomposing a carbon-containing liquid substance (dispersion medium) in the thermal plasma flame 24 without burning, the plasma gas used contains no oxygen. Examples of the plasma gas include hydrogen, helium and argon. The present invention is not limited to cases where the plasma gases are used singly but these plasma gases may be used in combination, as exemplified by hydrogen and argon or helium and argon.

It is necessary for the thermal plasma flame 24 to have a higher temperature than the boiling point of titanium powder and that of titanium oxide powder. On the other hand, the thermal plasma flame 24 preferably has a higher temperature because the titanium powder and the titanium oxide powder are more easily converted into a gas phase state. However, there is no particular limitation on the temperature. For example, the thermal plasma flame 24 may have a temperature of 6,000° C., and in theory, the temperature is deemed to reach around 10,000° C.

It is preferable that the ambient pressure inside the plasma torch 12 does not exceed atmospheric pressure. The ambient pressure not exceeding atmospheric pressure is not particularly limited and is, for example, in a range of 0.5 to 100 kPa.

The outside of the quartz tube 12*a* is surrounded by a concentrically formed tube (not shown) and cooling water is circulated between this tube and the quartz tube 12*a* to cool the quartz tube 12*a* with the water, thereby preventing the quartz tube 12*a* from having an excessively high temperature due to the thermal plasma flame 24 generated in the plasma torch 12.

The material supply device 14 is connected to the upper portion of the plasma torch 12 through the supply tube 14*a*. For the material supply device 14, use may be made of, for example, two systems including one which supplies titanium powder or titanium oxide powder in the form of powder and the other which supplies titanium powder or titanium oxide powder in the form of slurry containing it.

For example, the device disclosed in JP 2007-138287 A may be used as the material supply device 14 which supplies titanium powder or titanium oxide powder in the form of powder. In this case, the material supply device 14 includes, for example, a storage tank (not shown) storing titanium powder or titanium oxide powder, a screw feeder (not shown) transporting the titanium powder or titanium oxide powder in a fixed amount, a dispersion section (not shown) dispersing the titanium powder or titanium oxide powder transported by the screw feeder to convert it into the state of primary particles before the titanium powder or titanium oxide powder is finally diffused, and a carrier gas supply source (not shown).

Together with a carrier gas from the carrier gas supply source to which a push-out pressure is applied, titanium powder or titanium oxide powder is supplied into the thermal plasma flame 24 in the plasma torch 12 through the supply tube 14*a*.

The configuration of the material supply device 14 is not particularly limited as long as the device prevents titanium powder or titanium oxide powder from agglomerating, thus making it possible to diffuse the titanium powder or titanium oxide powder in the plasma torch 12 with the dispersed state maintained. An inert gas such as argon gas is used as the carrier gas. The flow rate of the carrier gas is controlled with a float type flowmeter. The flow rate value of the carrier gas indicates a value on the scale of the flowmeter.

For example, the device disclosed in JP 2011-213524 A may be used as the material supply device 14 which supplies titanium powder or titanium oxide powder in the form of slurry. In this case, the material supply device 14 includes a vessel (not shown) for introducing slurry (not shown), an agitator (not shown) agitating the slurry in the vessel, a pump (not shown) for supplying the slurry into the plasma torch 12 through the supply tube 14*a* with a high pressure applied thereto, and an atomization gas supply source (not shown) which supplies atomization gas for supplying the slurry into the plasma torch 12 in the form of droplets. The atomization gas supply source corresponds to the carrier gas supply source. The atomization gas is also called carrier gas.

In the embodiment under consideration, titanium powder or titanium oxide powder is dispersed in a carbon-containing liquid substance (hereinafter also referred to as "dispersion medium") to obtain a slurry, which is used to produce titanium carbide nanoparticles.

In this embodiment, examples of the carbon-containing liquid substance include alcohol, ketone, kerosene, octane and gasoline. Examples of the alcohol include ethanol, methanol, propanol and isopropyl alcohol. An industrial alcohol may also be used. The carbon-containing liquid substance (dispersion medium) serves as a carbon source which supplies carbon for carbonizing the titanium powder or titanium oxide powder. Therefore, the carbon-containing liquid substance is preferably more likely to be decomposed by the thermal plasma flame 24. The carbon-containing liquid substance is hence preferably a lower alcohol.

The mixing ratio between the titanium powder or titanium oxide powder and the dispersion medium in the slurry is, for example, 5:5 (50%:50%) to 3:7 (30%:70%) in terms of weight ratio.

Moreover, in preparing the slurry, one or a mixture of more than one selected from the group consisting of a surfactant, a polymer and a coupling agent may be added. A sorbitan fatty acid ester which is a nonionic surfactant is used as the surfactant, for example. Ammonium polyacrylate is used as the polymer, for example. A silane coupling agent or the like is used as the coupling agent, for example. By adding one or a mixture of more than one selected from the group consisting of the surfactant, the polymer and the coupling agent to the slurry, the titanium powder or titanium oxide powder is effectively prevented from agglomerating in the dispersion medium, thus enabling stabilization of the slurry.

In a case where the material supply device 14 supplying titanium powder or titanium oxide powder in the form of slurry is used, atomization gas from the atomization gas supply source to which a push-out pressure is applied is supplied together with the slurry into the thermal plasma flame 24 in the plasma torch 12 through the supply tube 14*a*. The supply tube 14*a* has a two-fluid nozzle mechanism for spraying the slurry into the thermal plasma flame 24 in the plasma torch and converting it into droplets, whereby the slurry can be sprayed into the thermal plasma flame 24 in the plasma torch 12, in other words, the slurry can be converted into droplets. As with the carrier gas, for example, argon, helium, hydrogen and the like are used singly or in a suitable combination for the atomization gas.

As described above, the two-fluid nozzle mechanism is capable of applying a high pressure to the slurry and atomizing the slurry with a gas, i.e., an atomization gas (carrier gas), and is used as a method for converting the slurry into droplets. For example, in a case where a nozzle having an internal diameter of 1 mm is used, liquid droplets having a size of about 5 to 10 pm are obtained by flowing the slurry at a supply pressure of 0.2 to 0.3 MPa and a flow rate of 20 mL/min and atomizing the slurry with an atomization gas (carrier gas) at a flow rate of 10 to 20 L/min.

In the embodiment under consideration, the two-fluid nozzle mechanism is used but a single-fluid nozzle mechanism may be used. Other exemplary methods include a method which involves causing a slurry to fall at a constant speed onto a rotating disk so as to convert the slurry into droplets (to form droplets) by the centrifugal force, and a method which involves applying a high voltage to the surface of a slurry to convert the slurry into droplets (to form droplets).

The chamber 16 is provided below and adjacent to the plasma torch 12. Titanium powder supplied into the thermal plasma flame 24 in the plasma torch 12 is evaporated into a gas phase state. Immediately after that, the titanium powder is carbonized and quenched in the chamber 16 by a gas mixture from a gas supply device 28 to be described later in detail to produce the primary nanoparticles 15 (titanium carbide nanoparticles). The chamber 16 also serves as a cooling tank.

In a case where titanium oxide powder is supplied into the thermal plasma flame 24 in the plasma torch 12, the titanium oxide powder is evaporated into a gas phase state as with the titanium powder. Immediately after that, the titanium oxide powder is reduced, carbonized and quenched in the chamber 16 by a gas mixture from the gas supply device 28 to be described later in detail to produce the primary nanoparticles 15 (titanium carbide nanoparticles).

As described above, for the material supply device 14, use may be made of, for example, two systems including one which supplies titanium powder or titanium oxide powder in the form of powder and the other which supplies titanium powder or titanium oxide powder in the form of slurry.

The gas supply device 28 includes a first gas supply source 28*a*, a second gas supply source 28*b* and piping 28*c*, and further includes a pressure application means (not shown) such as a compressor or a blower which applies push-out pressure to a gas mixture to be supplied into the chamber 16 which will be described later. The gas supply device 28 is also provided with a pressure control valve 28*d* which controls the amount of gas supplied from the first gas supply source 28*a* and a pressure control valve 28*e* which controls the amount of gas supplied from the second gas supply source 28*b*.

The first gas supply source 28*a* stores argon gas as the cooling gas and the second gas supply source 28*b* stores methane gas as the reactive gas.

Exemplary cooling gases that may be used in addition to argon gas include nitrogen gas, hydrogen gas, oxygen gas, air gas, carbon dioxide gas, water vapor and a gas mixture thereof.

The gas supply device 28 supplies a gas mixture of argon gas (cooling gas) and methane gas (reactive gas) at a predetermined angle, for example, in a direction of an arrow Q toward a tail portion of the thermal plasma flame 24, that is, toward an end of the thermal plasma flame 24 (an end portion of the thermal plasma flame 24) on the opposite side from the plasma gas supply port 12*c*, and also supplies the gas mixture from above to below along a side wall of the chamber 16, that is, in a direction of an arrow R shown in FIG. 1. The cooling gas and the reactive gas are controlled with a float type flowmeter. The flow rate value of each of the cooling gas and the reactive gas indicates a value on the scale of the flowmeter.

In addition to the effect of carbonizing and quenching the primary nanoparticles 15 produced in the chamber 16 as will be described later in detail, the gas mixture supplied from the gas supply device 28 has additional effects including contribution to the classification of the primary nanoparticles 15 in the cyclone 19.

In the case of the material supply device 14 which supplies the material in the form of powder, titanium powder or titanium oxide powder supplied from the material supply device 14 into the plasma torch 12 together with carrier gas is converted into a gas phase state in the thermal plasma flame 24. In the gas mixture of argon gas and methane gas supplied from the gas supply device 28 toward the thermal plasma flame 24 in the direction of the arrow Q, the titanium powder or titanium oxide powder is carbonized by the methane gas and quenched by the argon gas to produce the primary nanoparticles 15 of titanium carbide. In this process, the gas mixture supplied in the direction of the arrow R prevents the primary nanoparticles 15 from adhering to the inner wall of the chamber 16.

On the other hand, in the case of the material supply device 14 which supplies the material in the form of slurry, a slurry in the form of droplets which contains titanium powder and is supplied from the material supply device 14 into the plasma torch 12 using atomization gas at a predetermined flow rate is carbonized without burning in the thermal plasma flame 24 to produce titanium carbide. A slurry in the form of droplets which contains titanium oxide powder is carbonized, after reduction of titanium oxide, without burning in the thermal plasma flame 24, thereby producing titanium carbide. The titanium carbide, whether formed from the titanium powder or the titanium oxide powder, is quenched in the chamber 16 by argon gas (cooling gas) supplied toward the thermal plasma flame 24 in the direction of the arrow Q to produce the primary nanoparticles 15 of titanium carbide. In this process, the argon gas supplied in the direction of the arrow R prevents the primary nanoparticles 15 from adhering to the inner wall of the chamber 16.

As shown in FIG. 1, the cyclone 19 for classifying the produced primary nanoparticles 15 at a desired particle size is provided on a lower lateral side of the chamber 16. The cyclone 19 includes an inlet tube 19*a* which supplies the primary nanoparticles 15 from the chamber 16, a cylindrical outer casing 19*b* connected to the inlet tube 19*a* and positioned in an upper portion of the cyclone 19, a truncated conical part 19*c* continuing downward from a lower portion of the outer casing 19*b* and having a gradually decreasing diameter, a coarse particle collecting chamber 19*d* connected to a lower side of the truncated conical part 19*c* for collecting coarse particles having a particle size equal to or larger than the above-mentioned desired particle size, and an inner tube 19*e* connected to the collecting section 20 to be described later in detail and mounted on the outer casing 19*b* in a projected manner.

A gas stream containing the primary nanoparticles 15 produced in the chamber 16 is blown from the inlet tube 19*a* along the inner peripheral wall of the outer casing 19*b*, and this gas stream flows in the direction from the inner peripheral wall of the outer casing 19*b* to the truncated conical part 19*c* as indicated by an arrow T in FIG. 1, thereby forming a downward swirling stream.

The foregoing downward swirling stream is further accelerated by the inner peripheral wall of the truncated conical part 19*c* and then inverted to form an upward stream, which is discharged outside the system from the inner tube 19*e*. Part of the gas stream is inverted in the truncated conical part 19*c* before flowing into the coarse particle collecting chamber 19*d*, and is discharged outside the system from the inner tube 19*e*. The swirling stream imparts centrifugal force to the particles and coarse particles move along the wall direction due to the balance between the centrifugal force and drag. In addition, the primary nanoparticles 15 (titanium carbide nanoparticles) separated from the gas stream come down along the side surface of the truncated conical part 19*c* and are collected in the coarse particle collecting chamber 19*d*. Nanoparticles having insufficient centrifugal force imparted thereto are discharged outside the system along with the gas stream inverted on the inner peripheral wall of the truncated conical part 19*c*.

The apparatus is configured such that a negative pressure (suction force) is generated by the collecting section 20 as will be described in detail below and applied through the inner tube 19*e*. The apparatus is also configured such that, under the negative pressure (suction force), the titanium carbide nanoparticles separated from the above-mentioned swirling gas stream are attracted as indicated by an arrow U and sent to the collecting section 20 through the inner tube 19*e*.

On the extension of the inner tube 19*e*, which is an outlet for the gas stream in the cyclone 19, the collecting section 20 for collecting the secondary nanoparticles (titanium carbide nanoparticles) 18 having a desired particle size on the order of nanometers is provided. The collecting section 20 includes a collecting chamber 20*a*, a filter 20*b* provided in the collecting chamber 20*a*, and a vacuum pump (not shown) connected through a tube provided below inside the collecting chamber 20*a*. The nanoparticles delivered from the cyclone 19 are sucked by the vacuum pump (not shown) so as to introduce them into the collecting chamber 20*a* and collect them as made remaining on the surface of the filter 20*b*.

The method of producing titanium carbide nanoparticles using the above-described production apparatus 10 and the titanium carbide nanoparticles produced by the production method are described below.

In the embodiment under consideration, for example, two systems including one which supplies titanium powder or titanium oxide powder in the form of powder and the other which supplies titanium powder or titanium oxide powder in the form of slurry may be used in supplying a material. Methods of producing titanium carbide nanoparticles according to the respective material supply systems are now described.

Initially, in the case of supply in the form of powder, for example, titanium powder or titanium oxide powder having an average particle size of up to 50 μm is charged into the material supply device 14.

Plasma gases including hydrogen gas and argon gas are used and a high frequency voltage is applied to the coil 12*b* for high frequency oscillation to generate the thermal plasma flame 24 in the plasma torch 12.

A gas mixture of argon gas and methane gas is supplied in the direction of the arrow Q from the gas supply device 28 to the tail portion of the thermal plasma flame 24, i.e., to the end portion of the thermal plasma flame 24. At that time, the gas mixture is also supplied in the direction of the arrow R.

Next, the titanium powder or titanium oxide powder is transported with a gas, namely, argon gas used as a carrier gas, and supplied into the thermal plasma flame 24 in the plasma torch 12 through the supply tube 14*a*. Immediately after the titanium powder is evaporated into a gas phase state in the thermal plasma flame 24, the evaporated titanium powder is carbonized and quenched by the methane gas and the argon gas in the chamber 16 to produce the primary nanoparticles 15 (titanium carbide nanoparticles).

The methane gas is preferably supplied in an amount of 8 to 25 wt % with respect to the amount of the charged titanium powder or titanium oxide powder.

The primary nanoparticles 15 produced in the chamber 16 are blown from the inlet tube 19*a* of the cyclone 19 together with a gas stream along the inner peripheral wall of the outer casing 19*b*, and this gas stream thus flows along the inner peripheral wall of the outer casing 19*b* as indicated by the arrow T in FIG. 1, thereby forming a swirling stream, which goes downward. This swirling stream is further accelerated by the inner peripheral wall of the truncated conical part 19*c* and then inverted to form an upward stream, which is discharged outside the system from the inner tube 19*e*. Part of the gas stream is inverted on the inner peripheral wall of the truncated conical part 19*c* before flowing into the coarse particle collecting chamber 19*d*, and is discharged outside the system from the inner tube 19*e*.

The swirling stream imparts centrifugal force to the primary nanoparticles 15, and coarse particles included in the primary nanoparticles 15 move along the wall direction by the balance between the centrifugal force and drag. Of the primary nanoparticles 15, particles separated from the gas stream come down along the side surface of the truncated conical part 19*c* and are collected in the coarse particle collecting chamber 19*d*. Nanoparticles having insufficient centrifugal force imparted thereto are discharged outside the system from the inner tube 19*e* as the titanium carbide nanoparticles (secondary nanoparticles) 18 along with the gas stream inverted on the inner peripheral wall of the truncated conical part 19*c*. The gas stream into the cyclone 19 in this process preferably has a flow rate of 10 m/s or more.

Under the negative pressure (suction force) from the collecting section 20, the discharged titanium carbide nanoparticles (secondary nanoparticles) 18 are attracted in the direction indicated by the arrow U in FIG. 1, delivered to the collecting section 20 through the inner tube 19*e*, and collected on the filter 20*b* of the collecting section 20. The internal pressure of the cyclone 19 at that time is preferably not higher than atmospheric pressure. In addition, the titanium carbide nanoparticles (secondary nanoparticles) 18 are specified to be of any particle size on the order of nanometers according to the intended use.

Nanosized titanium carbide nanoparticles can be thus obtained in this embodiment.

The titanium carbide nanoparticles produced by the titanium carbide nanoparticle production method according to the embodiment under consideration have a narrow particle size distribution, that is to say, have a uniform particle size, and coarse particles having a particle size of 1 μm or more are hardly included. More specifically, the titanium carbide nanoparticles have an average particle size on the order of nanometers ranging from 1 nm to 100 nm.

It should be noted that the number of cyclones used in the titanium carbide nanoparticle production method according to the invention is not limited to one but may be two or more.

Nanoparticles just after the production collide with each other to form agglomerates thereby causing unevenness in particle size, which may reduce the quality. However, dilution of the primary nanoparticles 15 with the gas mixture supplied in the direction of the arrow Q toward the tail portion (end portion) of the thermal plasma flame prevents the nanoparticles from colliding with each other to agglomerate together.

On the other hand, the gas mixture supplied in the direction of the arrow R along the inner wall of the chamber 16 prevents the primary nanoparticles 15 from adhering to the inner wall of the chamber 16 in the process of collecting the primary nanoparticles 15, whereby the yield of the produced primary nanoparticles 15 is improved.

Under these circumstances, the gas mixture needs to be supplied in an amount sufficient to carbonize the titanium powder or titanium oxide powder and quench the resulting titanium carbide in the process of producing the primary nanoparticles 15 (titanium carbide nanoparticles) and is preferably supplied in such an amount that the flow rate enabling classification of the primary nanoparticles 15 at any classification point in the downstream cyclone 19 is obtained and that stabilization of the thermal plasma flame 24 is not hindered. The supply method, supply position and the like of the gas mixture are not particularly limited as long as the stabilization of the thermal plasma flame 24 is not hindered. According to the nanoparticle production apparatus 10 in the embodiment under consideration, a circumferential slit is formed in a top plate 17 to supply the gas mixture but any other method or position may be applied as long as the method or position applied enables reliable supply of gas on the path from the thermal plasma flame 24 to the cyclone 19.

Next, in the case of supply in the form of slurry, titanium powder with an average particle size of up to 50 μm or titanium oxide powder with an average particle size of up to 0.6 μm is used, for example, and an alcohol is used as the carbon-containing liquid substance (dispersion medium), for example. The mixing ratio between the titanium powder or titanium oxide powder and the dispersion medium is adjusted to 5:5 (50%:50%) in terms of weight ratio to prepare a slurry.

The slurry is introduced into the vessel (not shown) of the material supply device 14 shown in FIG. 1 and agitated by the agitator (not shown). The titanium powder or titanium oxide powder in the dispersion medium is thus prevented from precipitating, whereby the slurry containing the titanium powder or titanium oxide powder dispersed in the dispersion medium is maintained. The slurry may be continuously prepared by supplying the titanium powder or titanium oxide powder and the dispersion medium to the material supply device 14.

Next, the above-described two-fluid nozzle mechanism (not shown) is used to convert the slurry into droplets and the slurry in the form of droplets is supplied into the thermal plasma flame 24 generated in the plasma torch 12 using atomization gas at a predetermined flow rate, thereby producing carbon without burning the dispersion medium.

Next, the carbon is reacted with the titanium powder or titanium oxide powder to produce titanium carbide. The produced titanium carbide is quenched by argon gas supplied in the direction of the arrow Q and thus quenched in the chamber 16, whereby the primary nanoparticles 15 of the carbide are obtained.

It is preferable that the ambient pressure inside the plasma torch 12 does not exceed atmospheric pressure. The ambient pressure not exceeding atmospheric pressure is not particularly limited and is, for example, in a range of 660 Pa to 100 kPa.

In the case of supply in the form of slurry, the feed rate of the slurry may be changed. The feed rate of the slurry may also be controlled to be constant while changing the flow rate of the atomization gas (carrier gas) in charging the slurry. In this case, the flow rate of the atomization gas (carrier gas) is preferably 65 to 540 wt % with respect to the amount of the charged slurry in terms of powder. More specifically, in a case where the feed rate of the slurry is set at a value of 825 g/h in terms of the titanium powder or titanium oxide powder, the flow rate of the carrier gas is preferably in a range of 5 to 40 (L/min) and more preferably 7.5 to 25 (L/min).

In the embodiment under consideration, the argon gas needs to be supplied in the direction of the arrow Q in an amount sufficient to quench the carbide in the process of producing the primary nanoparticles and is preferably supplied in such an amount that the flow rate enabling classification of the primary nanoparticles 15 at any classification point in the downstream cyclone 19 is obtained and that stabilization of the thermal plasma flame is not hindered.

The total amount of the argon gas supplied in the direction of the arrow Q and the argon gas supplied in the direction of the arrow R should be set to 200 vol % to 5,000 vol % on the amount of gas supplied into the thermal plasma flame. The gas supplied into the thermal plasma flame as mentioned above refers to the whole of plasma gas for forming the thermal plasma flame, central gas for forming a plasma flow and atomization gas.

The primary nanoparticles 15 of carbide finally produced in the chamber 16 are subjected to the same process as those produced from the material supplied in powder form as described above.

Similarly to those obtained from the material supplied in powder form, under the negative pressure (suction force) from the collecting section 20, the discharged titanium carbide nanoparticles (secondary nanoparticles) 18 are attracted in the direction indicated by the arrow U, delivered to the collecting section 20 through the inner tube 19*e*, and collected on the filter 20*b* of the collecting section 20. The internal pressure of the cyclone 19 at that time is preferably not higher than atmospheric pressure. In addition, the titanium carbide nanoparticles (secondary nanoparticles) 18 are specified to be of any particle size on the order of nanometers according to the intended use.

The titanium carbide nanoparticles can be thus produced as described above.

The inventors of the invention had made a thorough experimental study and as a result found that the oxygen concentration of the titanium carbide nanoparticles to be produced can be varied by changing the amount of supply of reactive gas, methane gas in the above embodiment, included in the gas mixture. In addition, it was also found that the volume resistance (electric resistance) of the titanium carbide nanoparticles varies in value with the oxygen concentration thereof. Based on these findings, titanium carbide nanoparticles having different volume resistance (electric resistance) values as physical property values can be produced by controlling the oxygen concentration of the titanium carbide nanoparticles. In this case, the methane gas is preferably supplied in an amount of 8 to 25 wt % with respect to the amount of the charged titanium powder or titanium oxide powder.

The inventors of the invention had further made a thorough experimental study and as a result found that the oxygen concentration of the titanium carbide nanoparticles to be produced can be varied by changing the feed rate of the titanium powder or titanium oxide powder-containing slurry. It was also found that the volume resistance (electric resistance) of the titanium carbide nanoparticles varies in value with the oxygen concentration thereof also in this case. Based on these findings, titanium carbide nanoparticles having different volume resistance (electric resistance) values as physical property values can be produced by controlling the oxygen concentration of the titanium carbide nanoparticles.

According to the present invention, titanium carbide nanoparticles having desired electric resistance can be thus obtained by adjusting the oxygen concentration of the titanium carbide nanoparticles.

The inventors of the invention had further made a thorough experimental study and as a result found that the oxygen concentration of the titanium carbide nanoparticles to be produced can be varied by controlling the feed rate of the slurry to be constant and changing the flow rate of the carrier gas in charging the slurry. In this case, the flow rate of the carrier gas is preferably 65 to 540 wt % with respect to the amount of the charged slurry in terms of powder.

While the method of producing titanium carbide nanoparticles according to the invention has been described above in detail, the invention is by no means limited to the foregoing embodiments and it should be understood that various improvements and modifications are possible without departing from the scope and spirit of the invention.

EXAMPLE 1

The effects of the method of producing titanium carbide nanoparticles according to the present invention are described below in further detail. However, the present invention is not limited to the examples given below.

In this example, it was checked if titanium carbide nanoparticles having different volume resistance (electric resistance) values could be obtained by controlling the oxygen concentration of the titanium carbide nanoparticles.

A case where titanium carbide nanoparticles are to be produced from the material supplied in the form of titanium powder is first described.

In this example, titanium carbide nanoparticles were produced by using titanium powder with an average particle size of 45 μm, supplying argon gas in a constant amount, and supplying methane gas in an amount of 1 L/min or 3 L/min.

Conditions for producing the titanium carbide nanoparticles were as follows: The carrier gas used was argon gas; the plasma gases used were argon gas and hydrogen gas; and the gas mixture used included argon gas and methane gas (reactive gas).

Figure 2:
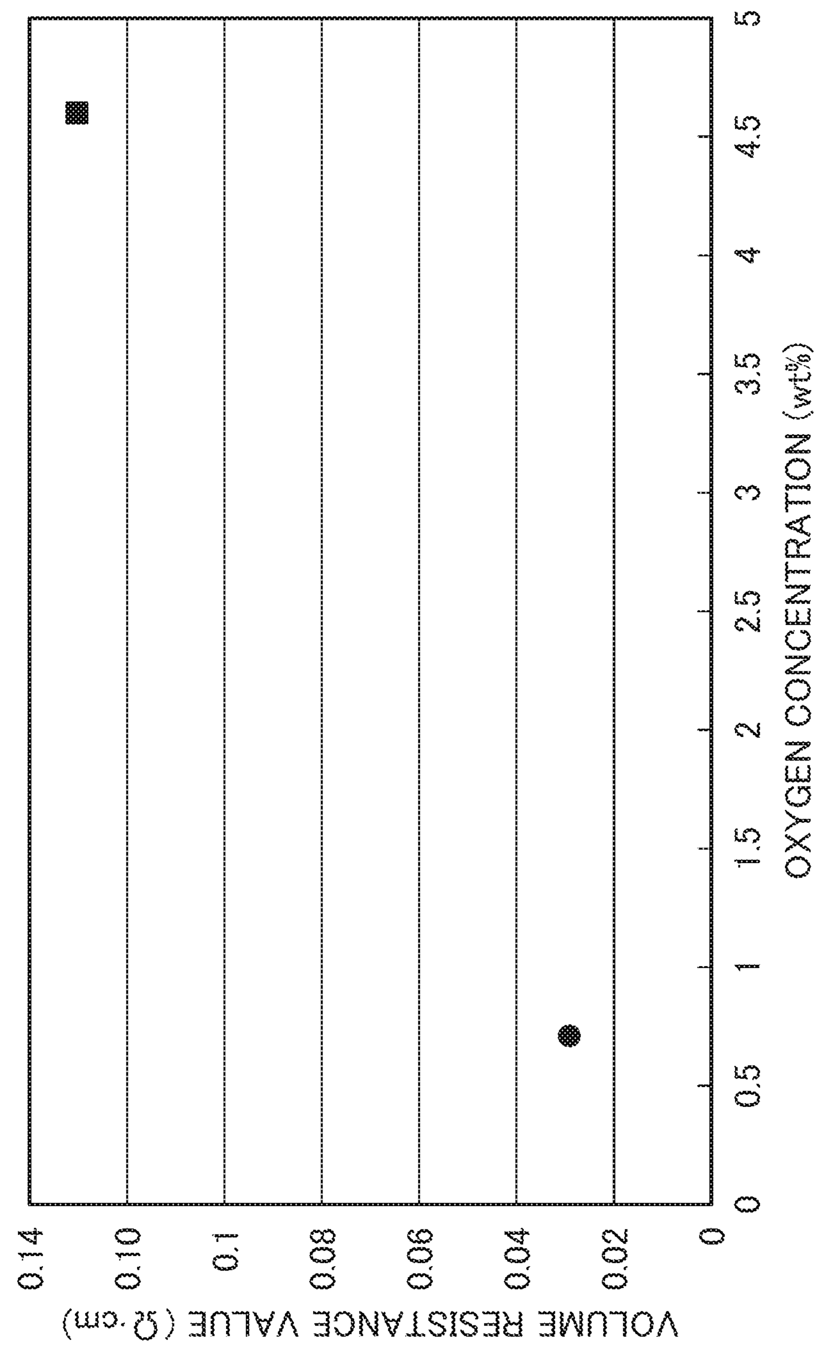
FIG. 2 is a graph showing the relation between the oxygen concentration and the volume resistance value in titanium carbide nanoparticles formed in a manner where titanium powder is supplied as a material.

With respect to the titanium carbide nanoparticles as obtained under the above-described production conditions, the volume resistivity was measured as an indication of electric resistance. The results are shown in the graph of FIG. 2. In FIG. 2, ● shows the result when the methane gas was supplied in an amount of 3 L/min and ■ shows the result when the methane gas was supplied in an amount of 1 L/min. When the methane gas was supplied in an amount of 3 L/min, the BET diameter was 27.5 nm and when the methane gas was supplied in an amount of 1 L/min, the BET diameter was 42.1 nm.

As shown in FIG. 2, the oxygen concentration of the resulting titanium carbide nanoparticles varied with the amount of methane gas supplied, and the volume resistance (electric resistance) of the titanium carbide nanoparticles varied in value with the oxygen concentration. According to the invention, the volume resistance (electric resistance) of titanium carbide nanoparticles is increased by increasing the oxygen concentration of the titanium carbide nanoparticles.

Thus, the invention makes it possible to produce titanium carbide nanoparticles having different volume resistance (electric resistance) values as physical property values by controlling the oxygen concentration of the titanium carbide nanoparticles.

The oxygen concentration was measured using an inert gas fusion-nondispersive infrared (NDIR) absorption method. The volume resistance value was measured using a 4-terminal 4-probe method.

EXAMPLE 2

In this example, it was checked if titanium carbide nanoparticles having different volume resistance (electric resistance) values could be obtained by controlling the oxygen concentration of the titanium carbide nanoparticles in a case where the titanium carbide nanoparticles were to be produced using a slurry containing titanium oxide powder. In this example, oxidized titanium powder was used as titanium oxide powder.

When the slurry was used to produce titanium carbide nanoparticles, the titanium carbide nanoparticles were produced by changing the feed rate of the oxidized titanium powder-containing slurry supplied to the thermal plasma flame.

The oxidized titanium powder used had an average particle size of 0.6 μm and the dispersion medium used was an industrial alcohol. The mixing ratio between the oxidized titanium powder and the industrial alcohol constituting the slurry was set to 50% in terms of weight ratio.

Figure 3:
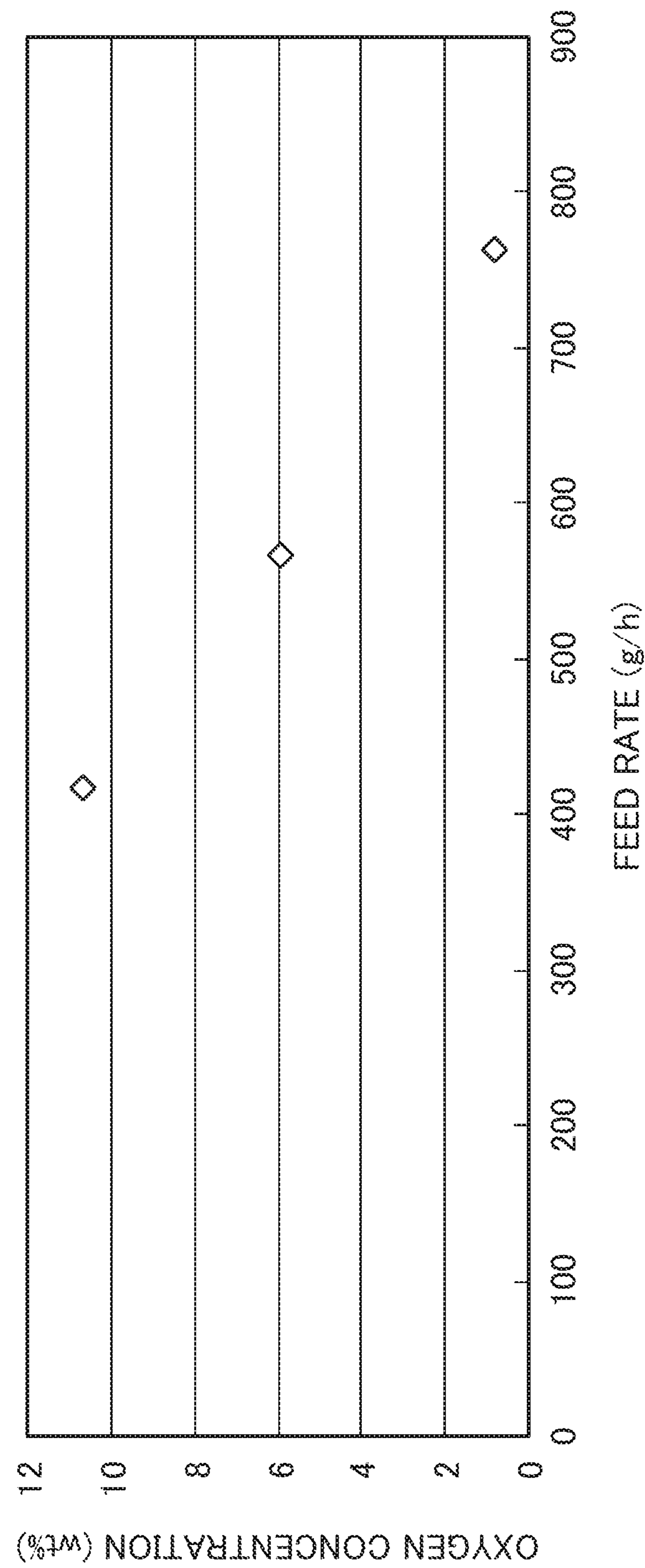
FIG. 3 is a graph showing the relation between the feed rate of an oxidized titanium powder-containing slurry and the oxygen concentration.

With respect to the titanium carbide nanoparticles as obtained under the above-described production conditions, the oxygen concentration was measured. The results are shown in FIG. 3. The oxygen concentration was measured using the same measurement method as in Example 1 mentioned above. Therefore, its detailed description is omitted.

It was revealed that the oxygen concentration of the resulting titanium carbide nanoparticles varied with the feed rate of the oxidized titanium powder-containing slurry supplied to the thermal plasma flame, as shown in FIG. 3. This is the same tendency as the case where titanium carbide nanoparticles are produced with oxidized titanium in the form of powder.

Figure 4:
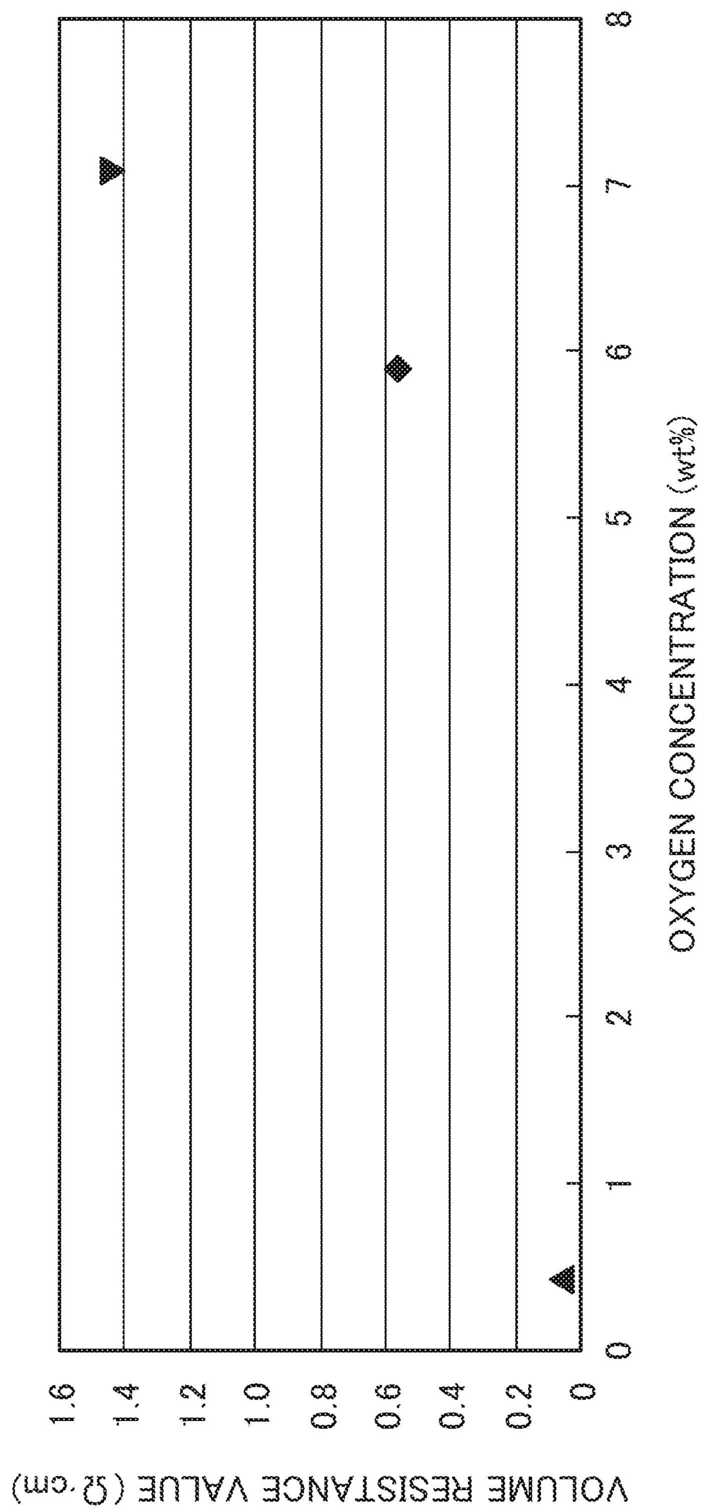
FIG. 4 is a graph showing the relation between the oxygen concentration and the volume resistance value in titanium carbide nanoparticles formed using the oxidized titanium powder-containing slurry.

Also in this example, the relation between the oxygen concentration and the volume resistance value as an indication of electric resistance in the titanium carbide nanoparticles formed using the slurry was examined. The results are shown in FIG. 4. In FIG. 4, ▲ indicates a feed rate of 702.3 g/h, ♦ indicates a feed rate of 567.3 g/h, and ▼ indicates a feed rate of 535.4 g/h.

The volume resistance value was measured using the same measurement method as in Example 1 mentioned above. Therefore, its detailed description is omitted.

Figure 5A:
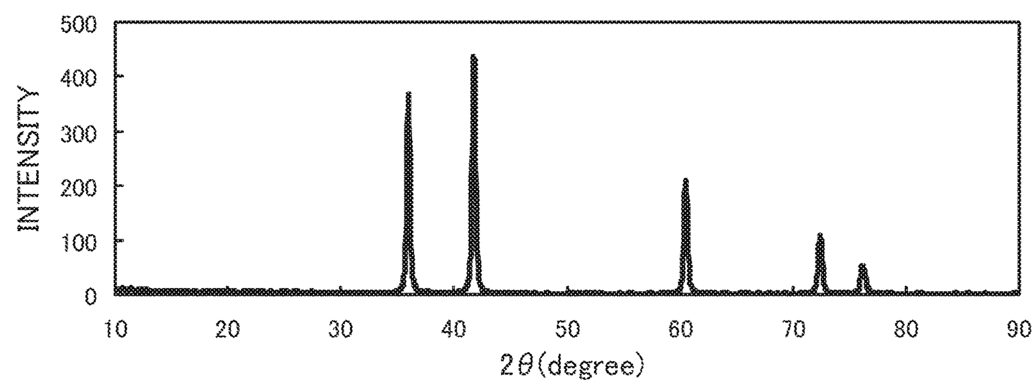
FIGS. 5A to 5C are graphs showing results of the crystal structure analysis of titanium carbide nanoparticles through X-ray diffractometry.
Figure 5B:
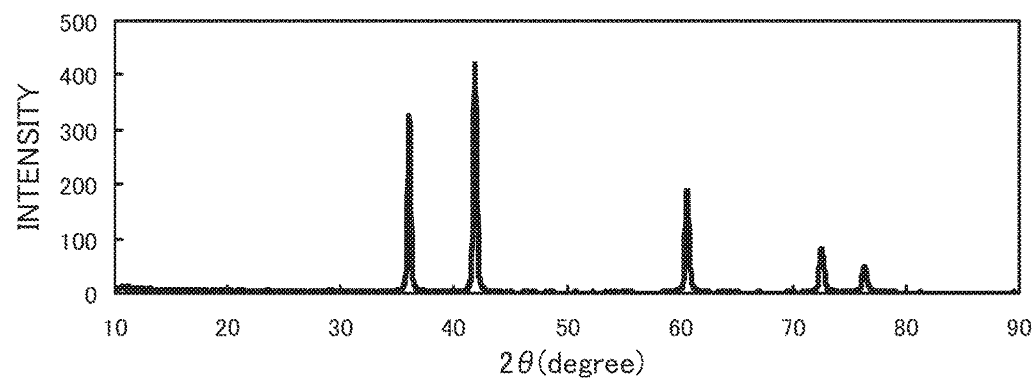
Figure 5C:
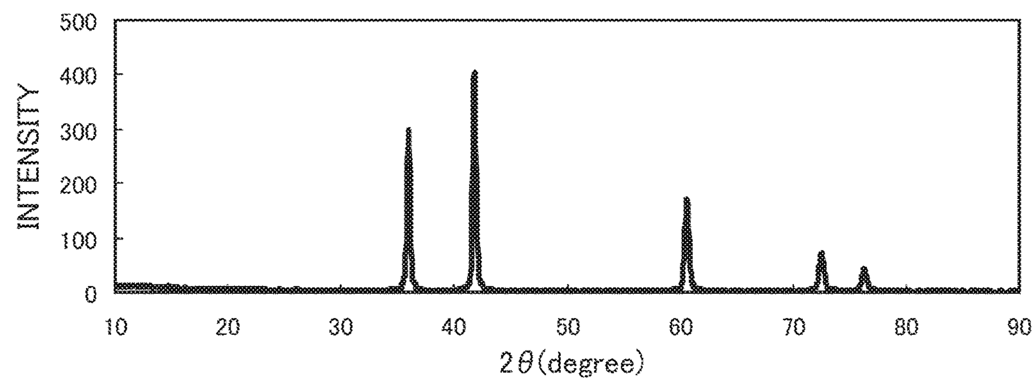

The crystal structure of the resulting titanium carbide nanoparticles was further examined using X-ray diffractometry (XRD). The results are shown in FIGS. 5A to 5C. In each of FIGS. 5A to 5C, the intensity on the vertical axis is dimensionless. The XRD spectrum shown in FIG. 5A resulted from ▲ shown in FIG. 4, the XRD spectrum shown in FIG. 5B from ♦ shown in FIG. 4, and the XRD spectrum shown in FIG. 5C resulted from ▼ shown in FIG. 4.

As shown in FIG. 4, the volume resistance (electric resistance) of the titanium carbide nanoparticles varied in value with the oxygen concentration thereof. According to the invention, even when an oxidized titanium powder-containing slurry is used, the volume resistance (electric resistance) of titanium carbide nanoparticles is increased by increasing the oxygen concentration of the titanium carbide nanoparticles. The above tendency is the same as that of the titanium carbide nanoparticles formed using titanium powder in the form of powder. According to the invention, the oxygen concentration of the titanium carbide nanoparticles can be thus varied irrespective of whether the material is used in the form of powder or slurry.

As shown in the XRD spectra of FIGS. 5A to 5C, all the titanium carbide nanoparticles formed using the slurry and shown in FIG. 4 only have peaks indicating the composition of titanium carbide and have no peak indicating the composition of other substances such as titanium oxide.

EXAMPLE 3

In this example, it was checked if the oxygen concentration of titanium carbide nanoparticles could be controlled in a case where the titanium carbide nanoparticles were to be produced using a slurry containing titanium oxide powder. In this example, oxidized titanium powder was used as the titanium oxide powder.

When the slurry was used to produce titanium carbide nanoparticles, the titanium carbide nanoparticles were produced by controlling the feed rate of the slurry, which contained the oxidized titanium powder and was to be supplied to the thermal plasma flame, to be set at a value shown below and changing the flow rate of the carrier gas in supplying the slurry. The feed rate of the slurry was 825 g/h (set value) ±25 g/h in terms of oxidized titanium powder.

Argon gas was used as the carrier gas and the flow rate of the carrier gas was set in a range of 7.5 to 25 (L/min).

The oxidized titanium powder used had an average particle size of 0.6 μm and the dispersion medium used was an industrial alcohol. The mixing ratio between the oxidized titanium powder and the industrial alcohol constituting the slurry was set to 50% in terms of weight ratio.

Figure 6:
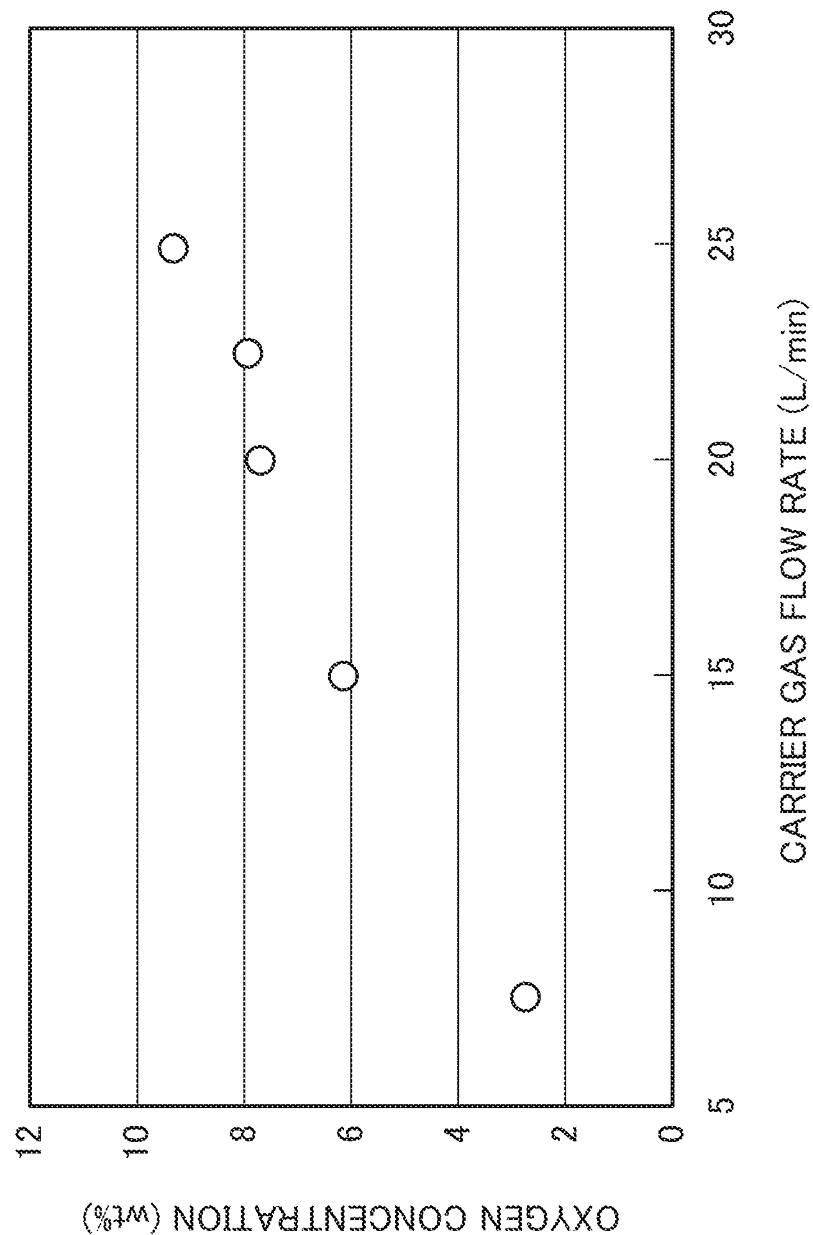
FIG. 6 is a graph showing the oxygen concentration of titanium carbide nanoparticles formed by controlling the feed rate of the oxidized titanium powder-containing slurry to be of a set value and changing the flow rate of carrier gas.

With respect to the titanium carbide nanoparticles as obtained under the above-described production conditions, the oxygen concentration was measured. The results are shown in FIG. 6. The oxygen concentration was measured using the same measurement method as in Example 1 mentioned above. Therefore, its detailed description is omitted.

It was revealed that, as shown in FIG. 6, the oxygen concentration of the resulting titanium carbide nanoparticles varied with the flow rate of the carrier gas even though the feed rate of the oxidized titanium-containing slurry to be supplied to the thermal plasma flame was controlled to be constant. This is the same tendency as the case where titanium carbide nanoparticles are produced with oxidized titanium in the form of powder.

Also in this example, the crystal structure of the resulting titanium carbide nanoparticles was examined using X-ray diffractometry (XRD). As a result, it has been confirmed that the same results as those shown in FIGS. 5A to 5C were also obtained in this example.

REFERENCE SIGNS LIST

10 nanoparticle production apparatus
12 plasma torch
14 material supply device
15 primary nanoparticles
16 chamber
18 nanoparticles (secondary nanoparticles)
19 cyclone
20 collecting section
22 plasma gas supply source
24 thermal plasma flame
28 gas supply device

The invention claimed is:

1. A titanium carbide nanoparticle production method comprising: a production step for producing titanium carbide nanoparticles using titanium powder or titanium oxide powder, a carbon source and a thermal plasma flame, wherein the production step comprises:

a step of dispersing the titanium powder or titanium oxide powder in a carbon-containing liquid substance as the carbon source to obtain a slurry; and a step of converting the slurry into droplets to supply the droplets into the thermal plasma flame, and wherein a feed rate of the slurry is controlled such that an oxygen concentration of the produced titanium carbide nanoparticles falls within a range of 1 to 10 mass %.

2. The titanium carbide nanoparticle production method according to claim 1, wherein the carbon-containing liquid substance is alcohol, ketone, kerosene, octane or gasoline.

3. The titanium carbide nanoparticle production method according to claim 2, wherein the thermal plasma flame is derived from at least one gas of hydrogen, helium and argon.

4. The titanium carbide nanoparticle production method according to claim 1, wherein the thermal plasma flame is derived from at least one gas of hydrogen, helium and argon.

5. A titanium carbide nanoparticle production method comprising: a production step for producing titanium carbide nanoparticles using titanium powder or titanium oxide powder, a carbon source and a thermal plasma flame, wherein the production step comprises:

a step of dispersing titanium powder or titanium oxide powder in a carbon-containing liquid substance as the carbon source to obtain a slurry; and a step of converting the slurry into droplets to supply the droplets into the thermal plasma flame by using a carrier gas, wherein, while a feed rate of the slurry is maintained to be constant, a flow rate of the carrier gas for charging the slurry is controlled such that an oxygen concentration of the produced titanium carbide nanoparticles falls within a range of 3 to 9 mass %.

6. The titanium carbide nanoparticle production method according to claim 5, wherein the carbon-containing liquid substance is alcohol, ketone, kerosene, octane or gasoline.

7. The titanium carbide nanoparticle production method according to claim 6, wherein the thermal plasma flame is derived from at least one gas of hydrogen, helium and argon.

8. The titanium carbide nanoparticle production method according to claim 5, wherein the thermal plasma flame is derived from at least one gas of hydrogen, helium and argon.

9. The titanium carbide nanoparticle production method according to claim 5, wherein the carrier gas is an inert gas.

10. The titanium carbide nanoparticle production method according to claim 5, wherein the flow rate of the carrier gas is 65 to 540 wt % with respect to an amount of charged slurry in terms of powder.

* * * * *